(No Model.) 3 Sheets—Sheet 2.
C. & F. BARTELT.
APPARATUS FOR MIXING GASES WITH LIQUIDS.
No. 522,396. Patented July 3, 1894.
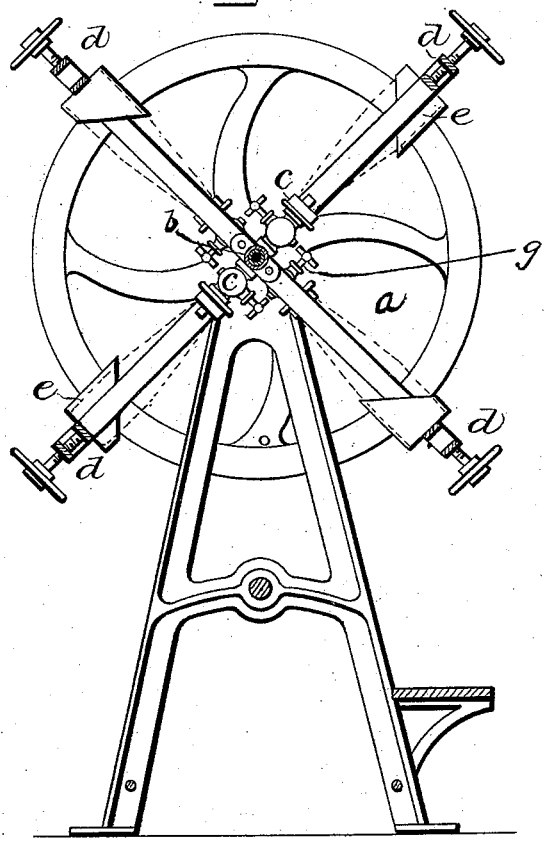
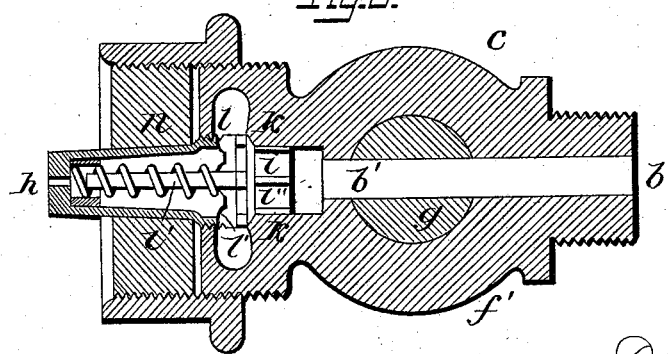
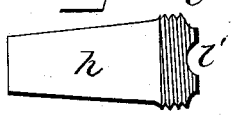
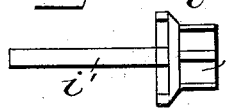

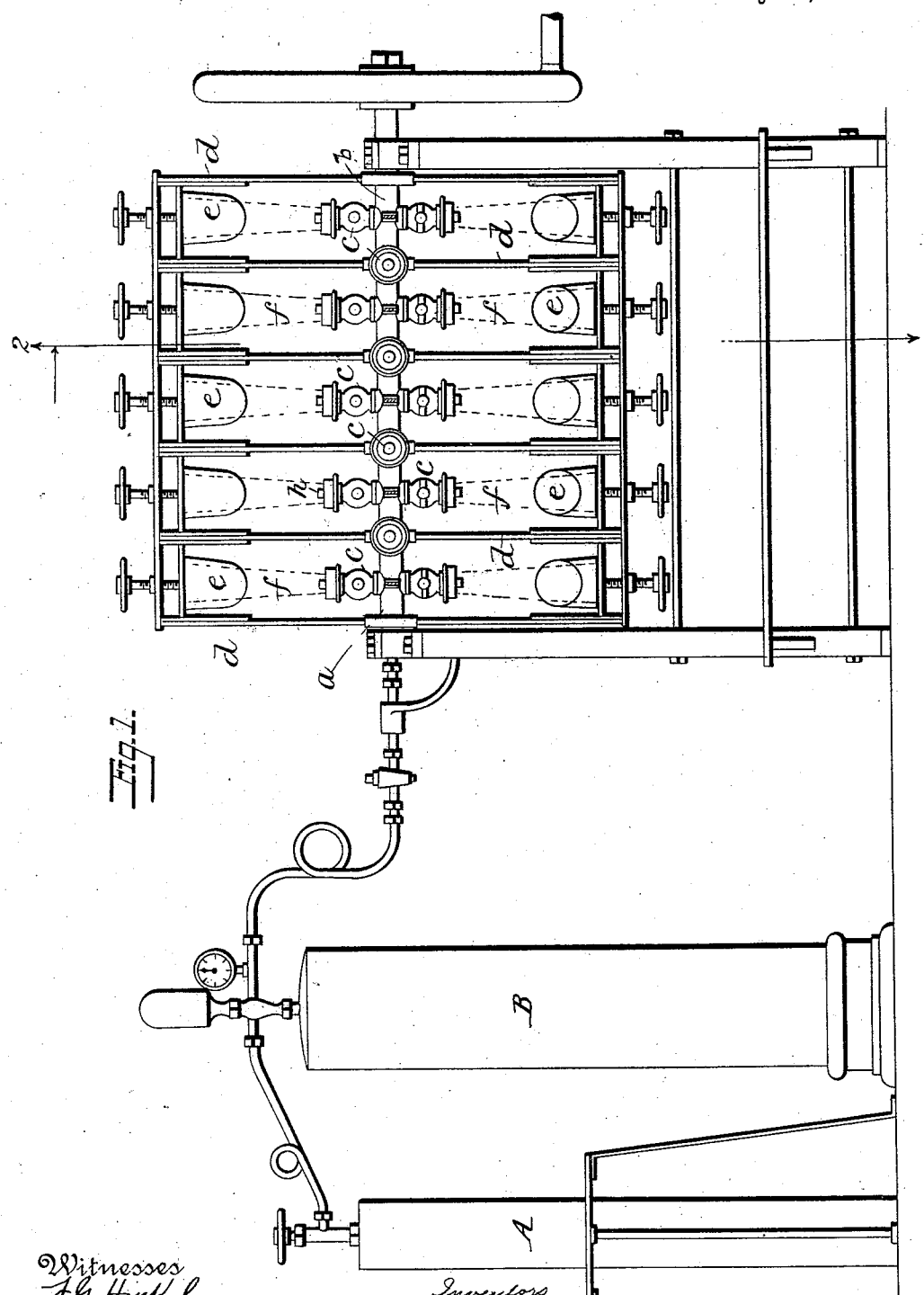

(No Model.) 3 Sheets—Sheet 3.
C. & F. BARTELT.
APPARATUS FOR MIXING GASES WITH LIQUIDS.
No. 522,396. Patented July 3, 1894.
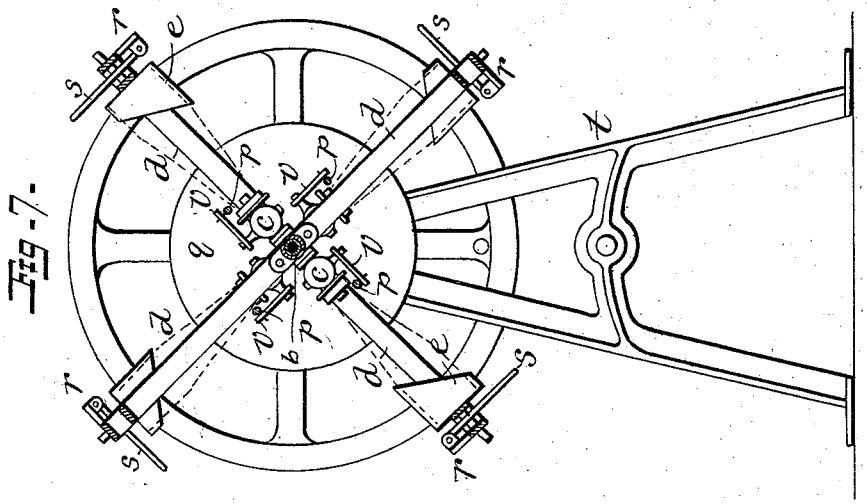
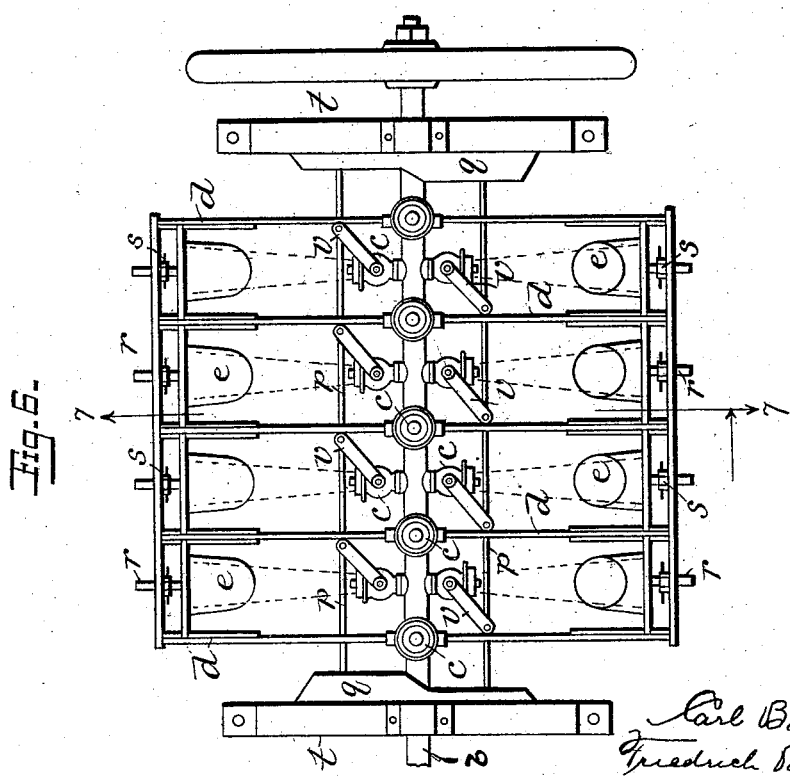
Witnesses
Carl Bartelt
Friedrich Bartelt
Inventors
By Foster & Freeman
Attorneys

UNITED STATES PATENT OFFICE.

CARL BARTELT AND FRIEDRICH BARTELT, OF FRANKFORT-ON-THE-MAIN, GERMANY.

APPARATUS FOR MIXING GASES WITH LIQUIDS.

SPECIFICATION forming part of Letters Patent No. 522,396, dated July 3, 1894.

Application filed November 17, 1893. Serial No. 491,242. (No model.)

*To all whom it may concern:*

Be it known that we, CARL BARTELT and FRIEDRICH BARTELT, subjects of the Emperor of Germany, residing at Frankfort-on-the-Main, Germany, have invented some new and useful Improvements in Apparatus for Mixing Gases with Liquids, of which the following is a specification.

This invention relates to apparatus for effecting an intimate mixture or thorough impregnation of liquids with gases being more especially intended for manufacturing sparkling or effervescing wines or beverages with rapidity and economy. The invention is hereinafter described as being employed in connection with this manufacture, its application to other analogous purposes being obvious.

In impregnating wine with carbonic acid in order to render it effervescent, it has heretofore been the practice to place the wine in large vessels in which by mechanical mixing and stirring it is brought into contact with the carbonic acid under pressure, the wine thus impregnated being subsequently drawn off into bottles. The agitation to which the wine is subjected according to this method injures its quality and the unavoidable contact with the metallic surfaces of the vessel of the apparatus and of the pipes imparts to it an objectionable flavor. Endeavors have been made to obviate these disadvantages by drawing off the wine that is to be impregnated in bottles, closing these bottles with a stopper provided with a peculiar non return valve and connecting them with a supply of gas under pressure. This method of impregnating has the disadvantage that the impregnation is imperfectly performed as the gas pressure acts solely upon the small area of surface exposed in the neck of the bottle so that the diffusion takes place very slowly and incompletely. In order to provide a remedy for this defect, the bottles closed with the specially constructed valvular stoppers have been packed in rotating drums, into which carbonic acid under pressure is introduced, but it is evident that merely a slight improvement is obtained in this way. The bottles must be very carefully packed in the drum in order that they may not knock against one another and the valvular stoppers involve an additional expense being moreover somewhat unsightly in appearance. By means of the apparatus constructed according to this invention these disadvantages are obviated, the bottles being corked in the usual manner and the wine in the bottles being thoroughly impregnated with carbonic acid with great rapidity and economy, as hereinafter described.

The apparatus is represented in the annexed drawings, in which—

Figure 1 is a front view and Fig. 2 a side view. Fig. 3 is an enlarged longitudinal section through the cock and valve box. Fig. 4 is an external view of the valve box detached and Fig. 5 is an external view of the valve. Figs. 6 and 7 are modifications as hereinafter described.

The apparatus is constructed with a rotatable bottle frame $a$ carried by a hollow shaft $b$ in the form of a tube or pipe connected with a carbonic acid generator. The hollow or tubular shaft is provided with a series of perforations, communicating with boxes $c$ containing valves controlling the communication with the charging orifices. The radial arms $d$ of the bottle frame project at right angles to the tubular shaft $b$ and carry rests or supports $e$ for the bottles $f$ which are pressed against the charging orifices so as to make a gas tight joint by means of hand screws acting upon the said supports, the charging orifices being provided with rings or washers of suitable elastic material, such as india rubber, cork or the like for the reception of the mouth of the bottle. The valve box is provided with a valve of special construction acting in such a manner that the pressure in the tube and valve box is always greater than the pressure in the bottle, it being consequently impossible for the liquid to pass into the pipes or passages behind the valve. The valve box (Fig. 3) is connected with the shell of a stop cock $g$ on one side and on the other side communicates with the atmosphere (or with the interior of the bottle, when the bottle is placed in position for charging) through a contracted orifice $h$. A conical or mushroom valve $i$ works in the valve chamber being provided with two seats $k$ and $l$, situated on opposite sides of the valve. The seat $k$ at the back of the valve is ground true so that the passage is completely closed when the valve is in contact with the seat. But the other seat $l$ in front of the valve being between the latter and the charging orifice is provided with lateral grooves or openings $l'$, which allow the carbonic acid to pass into the bottle when the valve is forced against this seat. The stem $i''$ of the valve being cruciform in transverse section acts as a guide working in the passage $b'$ communicating with the tubular shaft $b$. The valve is provided with a spring $n$ coiled upon the rod or guide $i'$ and tending to maintain the valve $i$ in the closed position on the seat $k$.

The carbonic acid from the generator A is caused to pass into an intermediate or expansion vessel B provided with a stop cock enabling it to be shut off from the generator when required. When sufficient pressure is obtained in the vessel as indicated by a gage, this stop cock is closed and another stop cock controlling the communication between the vessel B and the charging apparatus A is opened, care being taken to close all the cocks $g$ connected with the valve boxes. Any air that may be imprisoned in the tubular shaft $b$ or passages can be discharged by simply opening for an instant the cock of the valve box $g$ farthest from the supply pipe, so as to allow the pressure of the carbonic acid to drive out the air. The bottles being previously filled with wine, are placed on the supports and screwed up so as to make a tight joint around the charging orifice. The cocks $g$ connected with the charging valves are then opened and the carbonic acid under pressure passes into the mouths of the bottles. In order to get rid of any air that may be present in the necks of the bottles the cocks $g$ are closed and the clamping screws or supports of the bottles are slightly loosened so as to allow a small quantity of gas to escape directly into the atmosphere and drive out the air. The bottles are then tightened up again and the charging cocks $g$ again opened. These operations having been performed in the case of each bottle the tubular shaft $b$ is rotated by means of a crank handle $m$ for example. The bottles being arranged radially about the shaft $b$ are thereby caused to revolve with the latter and the liquid which they contain is shaken upward and downward being thereby brought into intimate contact with the carbonic acid. So long as the pressure in the tubular shaft $b$ is greater than that in the bottles $f$, the charging valves $i$ remain off their seats $k$ compressing their springs $n$ and allowing the carbonic acid to pass into the bottles. The passage of the acid is accelerated at each descent of the revolving bottles as the liquid descends or falls away from the charging orifices and tends to suck or draw the carbonic acid out of the tubular shaft $b$. The area of the passage through which the carbonic acid passes to the charging valve being considerably greater than that of the outlet orifice or passage leading to the bottle on the other side of the valve, an excess of pressure is always present in the valve box, which prevents the liquid from entering the latter. In case the pressure in the pipe or passage $b$ behind the valve becomes less than or merely equal to the pressure in the bottle or in front of the valve the latter is closed automatically by the spring and thus prevents the liquid from passing into the pipe or passage beyond or behind the valve. In this case also the liquid does not enter the valve box as the orifice between the latter and the bottle is too small to allow the liquid to mix with the gas in the box. From time to time according to the rate of absorption of the carbonic acid by the liquid the diminution in the presence of the gas in the expansion chamber B is compensated by opening the stop cock between this vessel and the generator A until the required pressure is re-established in the former. The rotary motion is continued until the pressure gage on the expansion chamber ceases to indicate a reduction of pressure owing to the liquid being unable to take up any more gas. The bottles are then allowed to remain stationary for a few minutes in order that the liquid may stand at rest under pressure after which they are removed one by one the corresponding stop cock $g$ being previously closed. The corking and tying down is then performed in the usual way.

The stop cocks carried by the revolving frame may be opened and closed automatically, being closed when they ascend and opened when they descend in the rotary motion of the bottles. By these means greater security is obtained against accidental entry of liquid into the passages behind the valve. With this object the plugs of the cocks $c$ (Figs. 6 and 7) are provided with lever arms $v$ and the levers $v$ of each series or row of cocks are jointed to one common rod or actuating device $p$. On the right and left hand sides of the apparatus fixed disks $t$ are placed, being provided with inclines or cam surfaces $q$ on the sides presented to the mechanism. These stationary cam surfaces $q$ are arranged in such a position that they act on the ends of the rods or actuating devices $p$ connected to the levers $v$ on the stop cocks $c$ and cause the latter to open and close automatically as hereinbefore described.

The screws as hereinbefore described as being employed for clamping or fixing the bottles in position in the apparatus may be replaced by strong springs $r$ which act upon the rests or supports $e$ of the bottles and cause them to force the latter against the charging orifices. These springs are provided with handles or levers $s$ by means of which the bottles can be removed and replaced on loosened for the escape of air as required. These springs greatly facilitate the working of the apparatus. Suitable stops are provided which limit the upward and downward movement of the springs and prevent excessive pressure being exerted on the bottles on the one hand and prevent straining of the spring by too forcible compression on the other hand.

We claim—

1. In an apparatus for charging bottled liquids with gases, the combination of a hollow rotating shaft conducting the gas under pressure, a bottle supporting frame rotating with said shaft and constructed to receive radially a number of series of bottles, separate series of radial valve boxes or cases corresponding to the number of bottles of each series, and check valves located in said boxes or cases, and operating directly at the end thereof adjacent the mouths of the bottles while the latter are being charged, substantially as described.

2. In apparatus for charging bottled liquids with gases the combination of a hollow rotating shaft conducting the gas under pressure, a bottle supporting frame rotating with said shaft and constructed of a number of radial arms carrying at their outer ends rests or supports for the bottles, separate series of valve boxes or cases radiating from the said hollow shaft, each provided with a check valve, and a stop cock, the said check valves being so arranged as to operate directly adjacent the mouths of the bottles being charged, substantially as described.

3. In an apparatus for charging bottled liquids with gases, the combination with the hollow rotating shaft, the bottle frame, and the valves and stop cocks, of the lever-arms connected with the stop cocks, the rods connecting the arms of each series of cocks, and the fixed disks provided with cam faces acting on the ends of the rods, substantially as shown and for the purpose described.

In testimony whereof we have signed our names to this specification in the presence of two subscribing witnesses.

CARL BARTELT.
FRIEDRICH BARTELT.

Witnesses:
FRANZ HASSLACHER,
HEINRICH IFFLAND.